Figure 5:
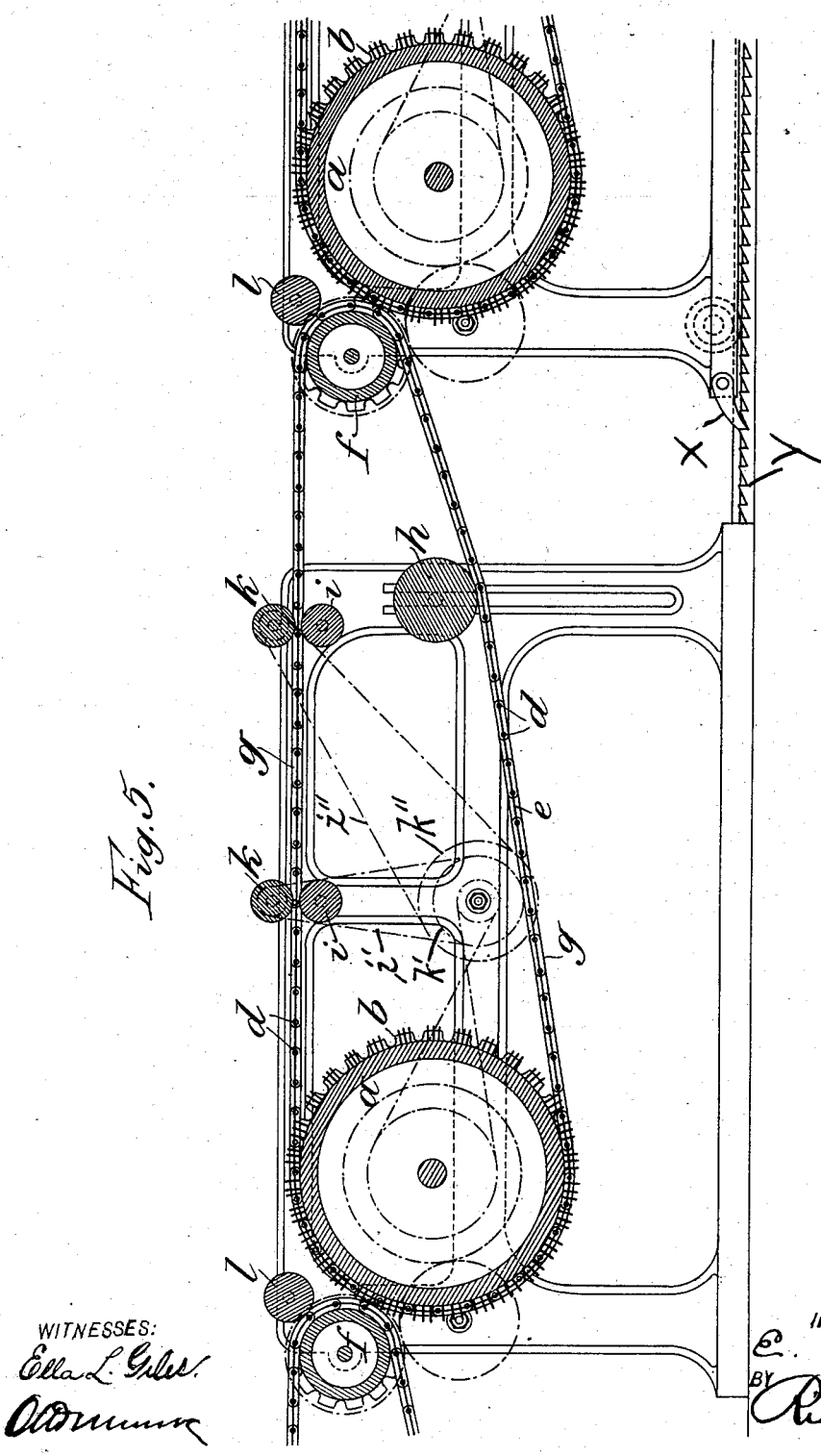

No. 654,648.
E. KORNHUBER.
APPARATUS FOR HACKLING AND DRAWING.
(Application filed Jan. 18, 1899.)
Patented July 31, 1900.
(No Model.)
3 Sheets—Sheet 1.
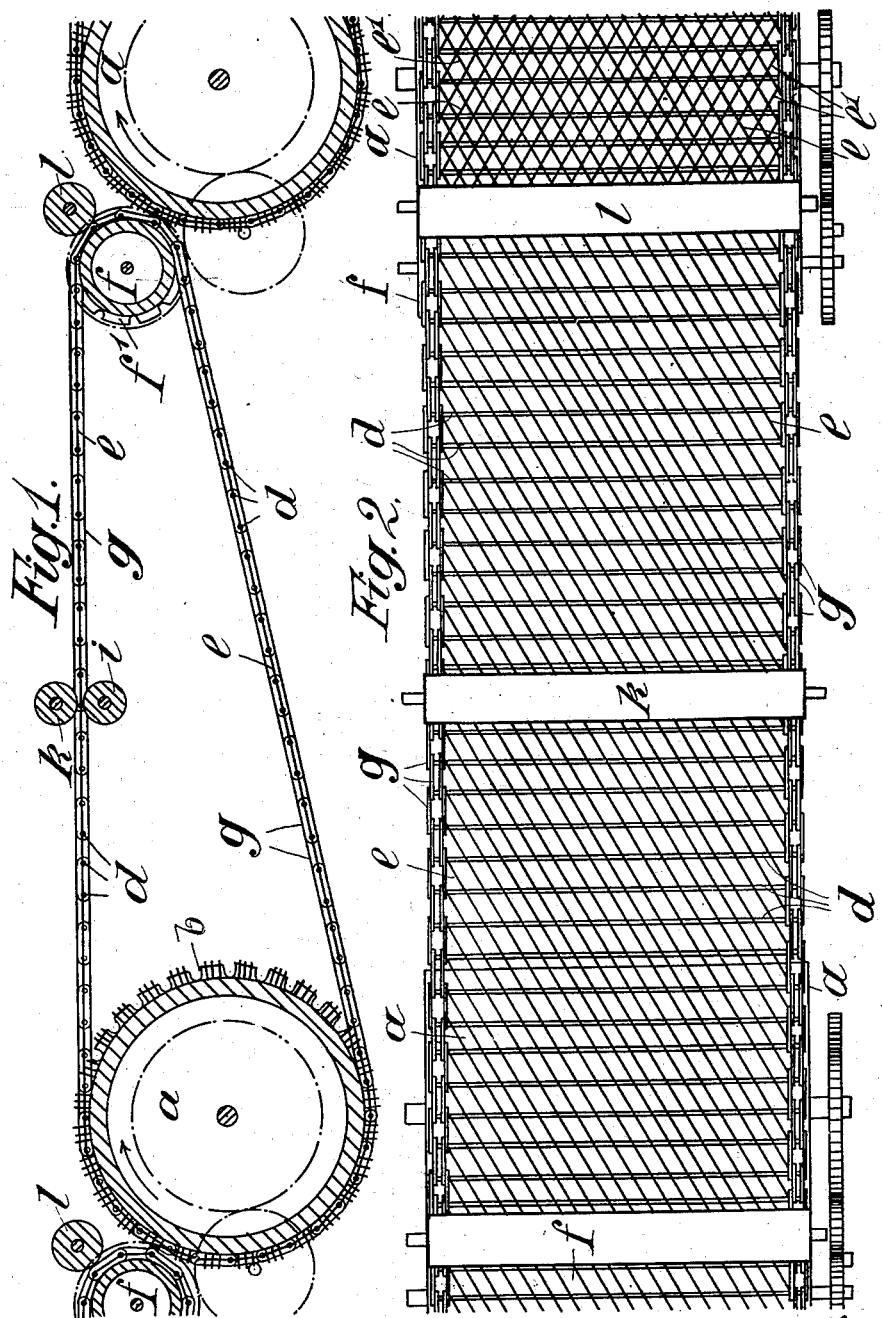

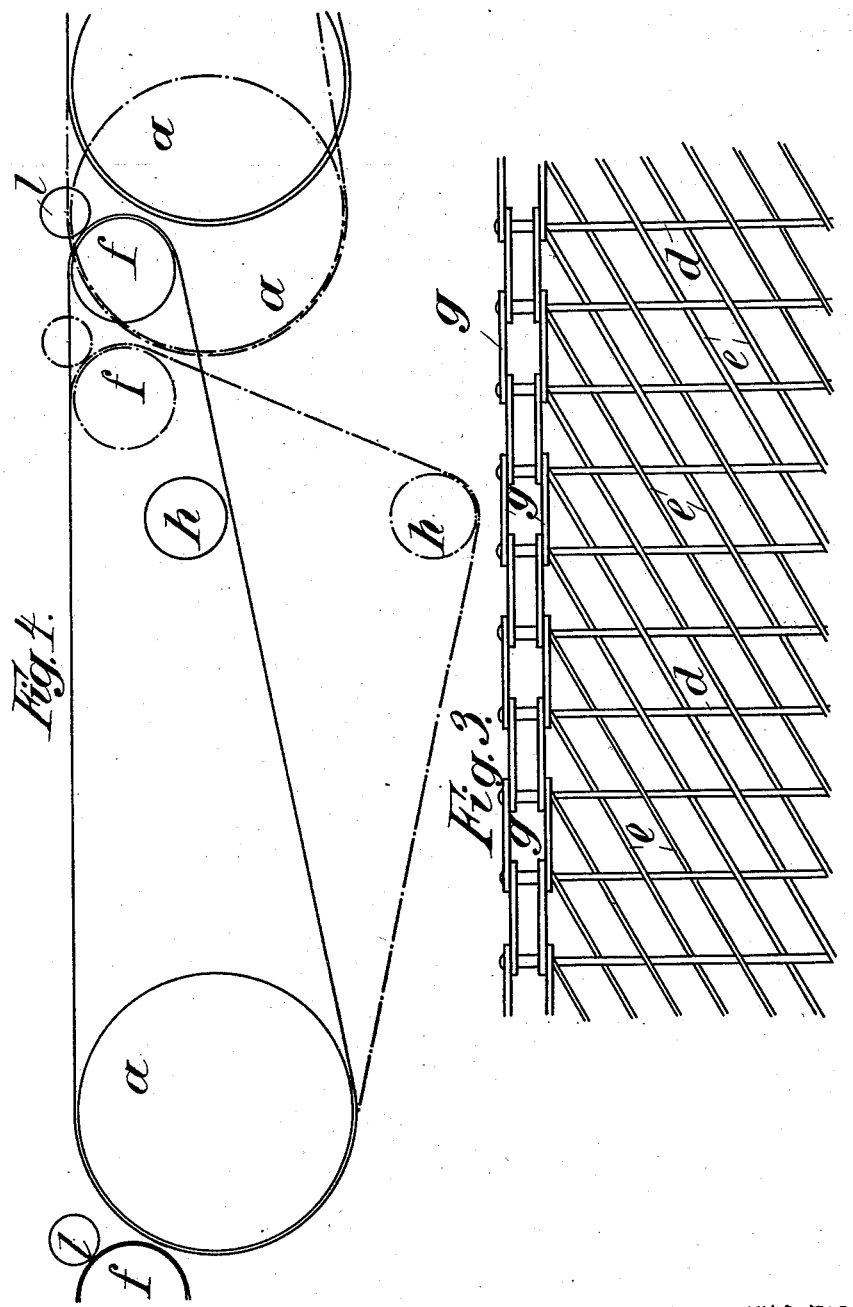

No. 654,648. Patented July 31, 1900.
E. KORNHUBER.
APPARATUS FOR HACKLING AND DRAWING.
(Application filed Jan. 18, 1899.)
(No Model.) 3 Sheets—Sheet 3.

WITNESSES:

INVENTOR
ATTORNEYS

UNITED STATES PATENT OFFICE.

EMIL KORNHUBER, OF LIBAU, RUSSIA.

APPARATUS FOR HACKLING AND DRAWING.

SPECIFICATION forming part of Letters Patent No. 654,648, dated July 31, 1900.

Application filed January 18, 1899. Serial No. 702,566. (No model.)

*To all whom it may concern:*

Be it known that I, EMIL KORNHUBER, manufacturer, of Libau, in the Empire of Russia, have invented certain new and useful Improvements in Apparatus for Hackling, Carding, and Drawing, of which the following is a specification.

The present invention relates to an apparatus for hackling and drawing which has the purpose of taking off the fibers entirely and unhurt from between the teeth of the cylinder and conveying them to the next drum or to the winding-on frame or to the coiler. The new apparatus thus replaces the entire complicated doffing apparatus used hitherto.

In the accompanying drawings the invention is represented, for instance, as applied to a hackling and drawing frame.

Figure 1 is a longitudinal section, and Fig. 2 a plan view, of the apparatus. Fig. 3 is a plan view of a portion of the net enlarged from that of Fig. 2. Fig. 4 shows a diagrammatic view of a modification. Fig. 5 is a sectional view showing the parts of Fig. 1 supported on the framework and certain means of adjustment.

Essentially the apparatus consists in an endless net made of parallel bars $d$, which are interwoven with diagonal wires or cords $e\ e'$. The net runs over the drum $a$ and a guide-roller $f$. The needles of the drum are arranged in parallel rows in such a way that after a certain number of rows a greater space between the rows is provided, so that a bar $d$ of the net can enter in this space. The distance between these spaces is the same as the distance between two bars of the net, so that the bars enter always into these spaces. In order that the motion of the drum may always correspond to that of the net, on both sides of the drum $a$ and the roller $f$ chain-wheels $b$ and $f'$ are provided for chains $g$, to which the bars $d$ of the net are fastened. Preferably the ends of the bars form the bolts for the chains $g$, as shown in Fig. 3. As the net lies directly on the circumference of the drum, the needles projecting over it take off the fibers and lay them on the net, which on its part takes them from the needles when it leaves the drum. On the net the material is conveyed to the next drum or to the winding-on frame or to the coiler. In order that the material may be securely brought between the teeth of the next drum, especially when it is somewhat rigid, a pressing-roller $l$ is provided. The free length of the net corresponds to the length of the material.

If the same machine is to be used for material of different length, the free length of the net must be made variable. A device for shortening directly the free length of the net is shown in Fig. 4. The guide-roller $f$ and the following drum can be displaced, as shown in dotted lines in Fig. 4, and the net is always held strained by a movable take-up roller $h$. This adjustment is effected, as shown in Fig. 5, by making the one section of the framework carrying one set of rollers adjustable toward and from the adjacent section of the framework by means of a pawl and rack $x\ y$. The cylinder $h$ is adjustable vertically in slots $z$ of the framework. This device, however, does not allow great differences in the lengths of the material. For greater differences another device must be employed. Under the working part of the net one or more supporting-rollers $i$ are arranged, and above them corresponding movable pressing-rollers $k$, the net, with the material lying on it, passing between them. The distance between the pairs of rollers must of course correspond to the length of material, because if stretching shall take place the fiber ends must still be under the one pair of cylinders, while the heads have entered between the next pair of cylinders. By these means the material is uniformly transported and at the same time the net itself is guided. The device just now described may also be used for the purpose of drawing the material. To this end the speed of the pressing-roller $k$ must be greater than that of the net. When several pairs of rollers are employed, the speed of the following roller must be greater than that of the preceding one in order to obtain a successive drawing, as shown in Fig. 5. The difference of speed of the rollers is accomplished by means of bands and pulleys $i'\ k'\ i''\ k''$.

In short, the advantages obtained by the new apparatus are the following: Material of every length can be worked when the last-described devices are employed. The fibers cannot be torn, as they are not at all held fast during the whole process. Therefrom results a very light-working condition and a faster working of the machines, the fleece or band being nevertheless of the utmost uniformity. Because of the latter fact the drawing process can be considerably shortened.

At least it is to be mentioned that the fire danger is considerably diminished by the new apparatus.

What I claim as my invention, and desire to secure by Letters Patent, is—

1. In combination, the drum having the needles disposed in rows with spaces between, an endless net running over the said drum and having bars $d$ to fit in the spaces between the needles, means for keeping the net with the bars in proper position relatively to the drum, said means consisting of the sprocket-wheels on opposite sides of the drum and chains attached to each side of the net and a guide-roller adjacent to the drum over which the net runs, substantially as described.

2. In combination, the drum having the needles disposed in rows with spaces between an endless net running over the said drum and having bars $d$ to fit in the spaces between the needles, means for keeping the net with the bars in proper position relatively to the drum, said means consisting of the sprocket-wheels on opposite sides of the drum and chains attached to each side of the net and a guide-roller adjacent to the drum over which the net runs and a gravity-roller $h$ engaging the lower part of the net, substantially as described.

3. In combination, the drum having the needles disposed in rows with spaces between an endless net running over the said drum and having bars $d$ to fit in the spaces between the needles, means for keeping the net with the bars in proper position relatively to the drum, said means consisting of the sprocket-wheels on opposite sides of the drum and chains attached to each side of the net and a guide-roller adjacent to the drum over which the net runs and roller $k$ engaging the net, with means for giving the roller a speed greater than that of the net, substantially as described.

4. In apparatus for hackling, carding and drawing the combination of a drum, a guide-roller, an endless net and pairs of rollers between the drum and the guide-roller with means for giving the rollers of the pairs different speeds, substantially as described.

Signed by me this 10th day of December, 1898.

E. KORNHUBER.

Witnesses:
H. SCHNECBERG,
E. CARLBLOM.